United States Patent
Yamashita et al.

(10) Patent No.: US 6,408,591 B1
(45) Date of Patent: Jun. 25, 2002

(54) DOOR BEAM OF ALUMINUM ALLOY

(75) Inventors: Hiroyuki Yamashita; Hisashi Takeuchi; Masakazu Hirano, all of Shimonoseki (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/277,224

(22) Filed: Mar. 26, 1999

(30) Foreign Application Priority Data

Mar. 27, 1998 (JP) ............................................. 10-100080

(51) Int. Cl.[7] ................................................. E04C 3/30
(52) U.S. Cl. .................... 52/731.6; 52/729.1; 52/735.1; 52/737.1; 296/188; 296/189
(58) Field of Search ............................ 52/731.6, 735.1, 52/739.1, 729.1, 737.1, 729.2–729.5, 730.4, 730.6, 731.7, 731.8, 737.6; 296/188, 109

(56) References Cited

U.S. PATENT DOCUMENTS

| | | | | |
|---|---|---|---|---|
| 412,397 A | * | 10/1889 | Lee | 52/731.7 |
| 496,463 A | * | 5/1893 | White | 52/731.7 |
| 496,465 A | * | 5/1893 | White | 52/731.7 X |
| 2,444,091 A | * | 6/1948 | Carlsen | 52/731.7 X |
| 2,583,439 A | * | 1/1952 | Oswald et al. | 52/730.6 X |
| 3,332,197 A | * | 7/1967 | Hinkle | 52/731.7 X |
| 3,904,380 A | * | 9/1975 | Smith | 52/731.7 X |
| 5,046,777 A | * | 9/1991 | Garnweidner et al. | 296/189 |
| 6,082,073 A | * | 9/1991 | Silvanus et al. | 52/731.6 |
| 5,056,861 A | * | 10/1991 | Garnweidener et al. | 296/188 |
| 5,657,596 A | * | 8/1997 | Powers, III | 52/731.7 X |
| 6,017,403 A | * | 1/2000 | Masumoto et al. | 148/549 |
| 6,054,197 A | * | 4/2000 | Rastegar | 428/35.7 |

FOREIGN PATENT DOCUMENTS

| | | | | |
|---|---|---|---|---|
| AT | 000248782 | * | 1/1964 | 52/731.7 |
| DE | 11 07 945 | | 5/1961 | |
| EP | 0 235 091 | | 9/1987 | |
| EP | 0 284 566 | | 9/1988 | |
| EP | 000434559 | * | 6/1991 | 52/731.7 |
| FR | 001534871 | * | 6/1968 | 52/731.7 |
| FR | 2 713 664 | | 6/1995 | |
| GB | 1651 | * | of 1858 | 52/731.7 |
| GB | 001173721 | * | 12/1969 | 52/731.7 |
| GB | 001582426 | * | 1/1981 | 52/731.7 |
| GB | 001590435 | * | 6/1981 | 52/731.7 |
| JP | 58-168913 | | 11/1983 | |
| JP | 05-246242 | | 9/1993 | |
| JP | 5-286364 | | 11/1993 | |
| JP | 5-319092 | | 12/1993 | |
| JP | 5-330450 | | 12/1993 | |
| JP | 6-171362 | | 6/1994 | |
| JP | 7-164880 | | 6/1995 | |

* cited by examiner

Primary Examiner—Carl D. Friedman
Assistant Examiner—Yvonne M. Horton
(74) Attorney, Agent, or Firm—Oblon, Spivak, McClelland, Maier & Neustadt, P.C.

(57) ABSTRACT

A door beam to obtain a maximal load and an energy absorption required in no need of increase in weight without occurrence of rupture thereof and to have deformation of a cross-section effected in a stable manner even when a length of the door beam is shortened, wherein a cross-section that a compression-side flange and a tension-side flange are connected parallel to each other, by at least one web in a section perpendicular to a length direction and central lines of the compression-side flange and the tension-side flange are shifted from each other.

21 Claims, 8 Drawing Sheets

FIG. 8 (WHEN BUCKLING OCCURS IN A COMPARATIVELY EARLY STAGE)

FIG. 9 (WHEN RUPTURE OCCURS IN A COMPARATIVELY EARLY STAGE)

FIG. 10 (WHEN BUCKLING OCCURS IN A COMPARATIVELY LATE STAGE BEFORE RUPTURE OCCURS)

FIG. 11

P : LOAD

C : PRINCIPAL AXIS e : CENTER OF GRAVITY

θ : ANGLE BETWEEN A PRINCIPAL AXIS AND A LOADING DIRECTION OF A LOAD (SMALLER ANGLE)

FIG. 12

DOOR BEAM OF ALUMINUM ALLOY

BACKGROUND OF THE INVENTION

1. Field of the Invention

The present invention relates to a door beam of an aluminum alloy as a member to reinforce a door for a vehicle such as an automobile, truck and the like, disposed in a door along a front-to-rear direction thereof for securing safety of a passenger and a driver by absorbing a crash shock from a side.

2. Description of the Prior Art

Under the situation in which environmental protection on earth has been regarded as important on a global scale, for example, enforcement of the regulations on reduction of exhaust gas and carbon dioxide gas, etc from automobiles have been stricter in various countries for suppressing global warming, leading to lightweight automobiles rapidly.

A door beam for an automobile, also referred to as an impact beam, an impact bar, a guard bar or a door side beam, mounted in the interior of a door along its front-to-rear direction, functions to absorb a shock in crash. As material, steel (for example, high tensile steel of a 150 kgf/mm² class) has been employed, recently in view of weight saving, application of an extrusion of aluminum alloy has been studied.

In a condition that a door beam of an aluminum alloy is held at its both ends, as a load at a central portion is increased, a central portion of the door beam causes bending deformation being pushed down. In the deformation, a tensile-strain is produced in a flange located in the tension-side (hereinafter simply referred to as a tension-side flange, and while a flange in the side where a load is imposed is hereinafter termed as a flange located in the compression-side or simply referred to as a compression-side flange, the tension-side flange is a flange opposed to the compression-side flange) and as a displacement of the central portion is further increased, a tensile-strain eventually exceeds a critical value for rupture and rupture occurs in the tension-side flange.

In order to increase the displacement when the rupture occurs (hereinafter simply referred to as rupture displacement), a method is disclosed in the published Unexamined Japanese Patent Application No. Hei 5-246242, that a position of a neutral axis of bending is shifted toward the tension-side by a necessary distance and another method is also disclosed in the published Unexamined Japanese Patent Application No. Hei 6-171362, that in addition to the shift of a neutral axis, a local buckling is induced in a compression-side flange after the maximal bending strength is cleared and a stress on the tension-side flange is rapidly reduced.

For securing safety of a passenger and a driver, door beams tend to be applied to the field of compact cars, where the length of the door beams needs to be shortened. For example, when applied to the rear doors of a compact type 4 door car, a length of a door beam are sometimes 800 mm or less (the objective of the Unexamined Japanese Patent Application No. Hei 6-171362 is door beams of 800 mm long or more), causing rupture at a smaller displacement than in a conventional long door beam. On the other hand, it is conceivable that a strength of an aluminum alloy constituting the door beams is reduced in order to allow a rupture displacement to a higher extent. In that case, there arises a problem that a maximal load and an energy absorption both required at the given weight of the door beam cannot be attained.

The Unexamined Japanese Patent Applications Nos. Hei 5-330450 and Hei 5-319092 are directed to a door beam composed of a pair of flanges and a pair of webs, where a strength of the web is set so that a beam cross-section is changed according to an impact load and thereby preventing a rupture of a tension-side flange from occurring. Concretely, the means are such that one web is thinner than the other, a corner fillet section or a notch portion is provided on one of joints between a compression-side-flange and both webs, for enabling a cross-section of a beam to be deformed into a rhombic shape (both webs are to be fallen sidelong). These enables to prevent rupture of a tension-side flange from occurring and to attain a large bending deformation and a high energy absorption. Where a door length is short, however, deformation of a cross-section is not stably produced, causing a rupture.

The rupture of door beams has to be avoided in an absolute sense since it has a possibility to injure a passenger or a driver.

BRIEF SUMMARY OF THE INVENTION

The present invention has been made in light of such problems, accordingly aims at providing a door beam to obtain the required maximal load and energy absorption in no need of weight increase without occurrence of rupture thereof and to have the deformation of a cross-section effected in a stable manner even when a length of the door beam is shortened.

A door beam of an aluminum alloy according to the present invention has, as a feature, a cross-section that a compression-side flange and a tension-side flange are connected parallel to each other, by at least one web in a section perpendicular to a length direction and central lines of the compression-side flange and the tension-side flange are shifted from each other. In other words, a door beam of an aluminum alloy according to the present invention has, as a feature, a cross-section that a compression-side flange and a tension-side flange are connected parallel to each other, by at least one web in a section perpendicular to a length direction and that extensions in both sides of the compression-side flange are different in length and extensions in both sides of the tension-side flange are also different in length, while longer side ends of the extensions of the compression-side flange and the extensions of the tension-side flange are in one diagonal. Further, in a door beam of an aluminum alloy according to the present invention, a principal axis is inclined from a loading direction by an angle in the range from 5 degrees to 25 degrees in a section perpendicular to a length direction.

Figure 1:
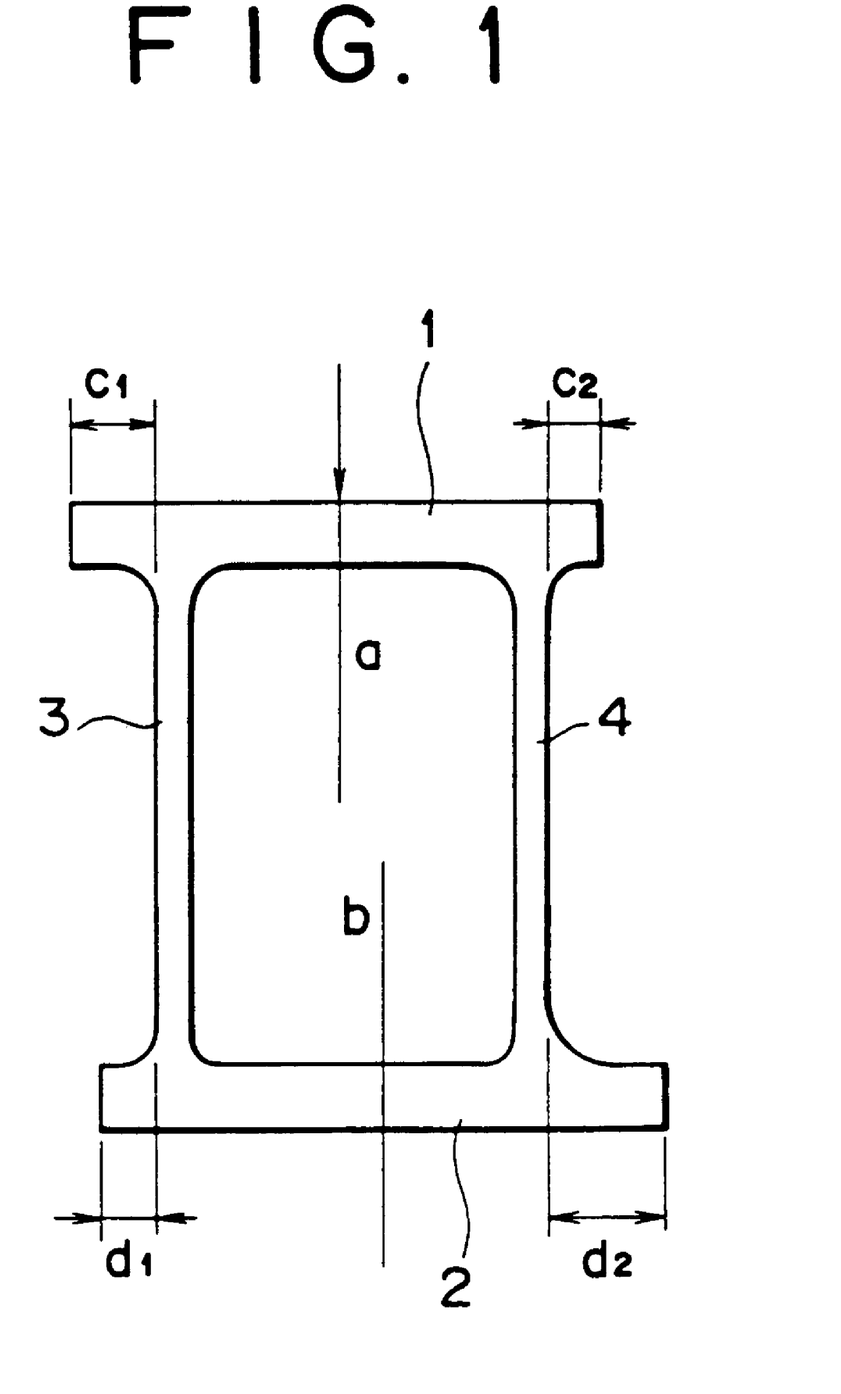
FIG. 1 shows a cross-section of a door beam according to the present invention.

A door beam according to the present invention will be described by taking the case of a door beam which has a cross-section that a compression-side flange 1 and a tension-side flange 2 are connected by a pair of webs 3, 4 as an example (see FIG. 1). A central line (a) of the compression-side-flange 1 {a straight line drawn along a loading direction passing through the center of the compression-side flange, wherein in a flange of a uniform thickness, a center of the flange is located at a point which is inward spaced along a width direction (a lateral direction in FIG. 1) from one end of the flange by a half width and in FIG. 1, a pair of a flange are in parallel to each other and a pair of webs are also in parallel to each other, and the flanges are perpendicular to the webs, so that a loading direction is parallel to a direction of the webs} and a center (b) of the tension-side flange are shifted from each other. In other words, lengths c1, c2 of extensions (in detail, portions extending from the webs, left and right) in the both sides of the compression-side flange 1 are different from each other and lengths d1, d2 of extensions in both sides of the tension-side flange 2 are also different from each other, while ends c1, d2 of the longer side extensions are located in one diagonal (needless to say that ends c2, d1 of the shorter side extensions are located in the other diagonal).

Figure 11:
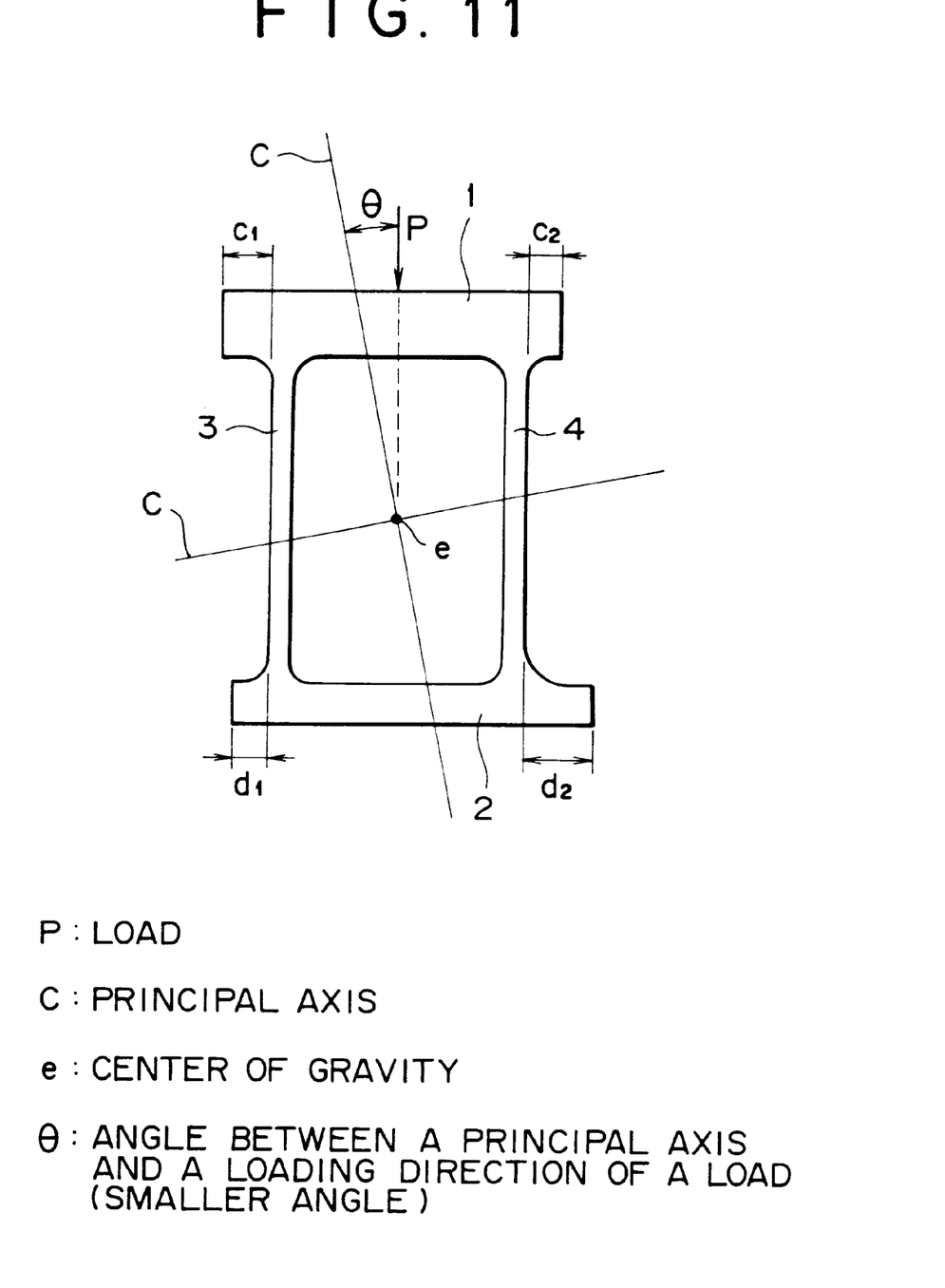
FIG. 11 shows a basic cross-section of a door beam according to the present invention.

Furthermore, a principal axis (C) is inclined from a loading direction (P), indicated by an arrow, by an angle in the range from 5 degrees to 25 degrees (see FIG. 11). Two principal axes are those which pass through the center of gravity (as same as the center of figure) of a section and are always perpendicular to each other, and, in any section, a moment of inertia is maximal about one of the axes, while a moment of inertia is minimal about the other of the axes. The angle referred to in the present invention is a smaller one of angles between the two principal axes and the loading direction.

Figure 3:
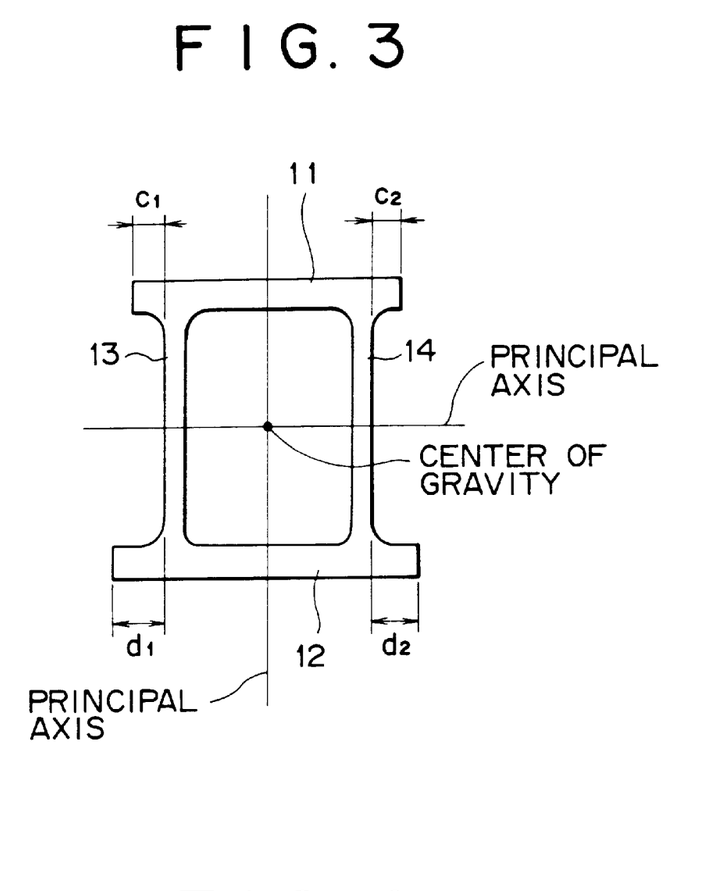
FIG. 3 shows a cross-section of a conventional door beam.
Figure 4:
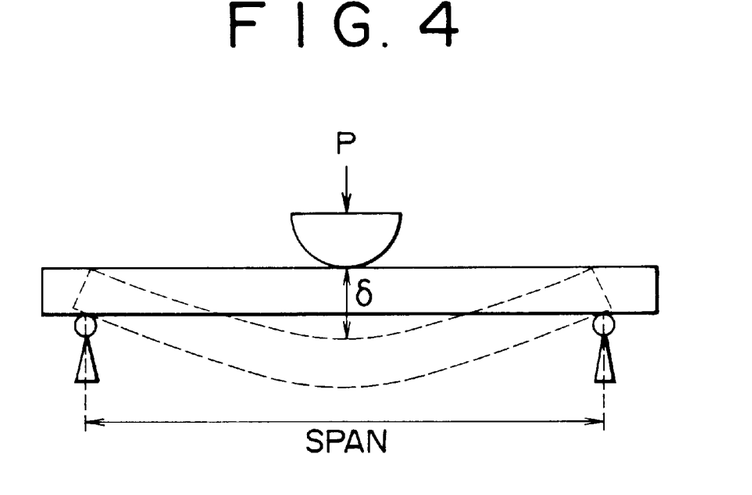
FIG. 4 is representations for illustrating a three-point bending test for a door beam.

Conventional door beams of an aluminum alloy described in the Unexamined Japanese Patent Applications Nos. Hei 5-246242 and Hei 6-171362, and the like have a cross-section that as shown in FIG. 3, in a section perpendicular to a length direction, a compression-side flange 11 and a tension-side flange 12 are connected by a pair of webs 13, 14 and symmetric between the left and right sides. Hence, central lines of the compression-side flange 11 and the tension-side flange 12 coincide with each other and lengths c1, c2 of extensions in the both sides of the compression-side flange 11 are equal and lengths d1, d2 of extensions in the both sides of the tension-side flange 12 are also equal (c1=c2 and d1=d2). In addition, two principal axes are in parallel and perpendicular, respectively, to a loading direction and therefore, the angle said in present invention, the smaller angle between the principal axis and the loading direction, is 0 degree.

Since a conventional door beam has a such a cross-section, when a three-point bending test in which both ends are supported and a central portion is pressed by a semicircular cylinder rigid body (in general, at a laboratory level, a bending performance of a door beam is evaluated by a result of the test) is conducted, a central line of the compression-side flange coincides with a central line of the tension-side flange (the central lines coincide with one of the two principal axes) and the cross-section retains almost its original shape immediately before rupture, whereby strain in the tension-side flange 12 is accumulated. Such a trend appears in a load (P)-displacement ($\delta$) curve as well and a rupture is suddenly produced to release the accumulated strain.

Figure 2:
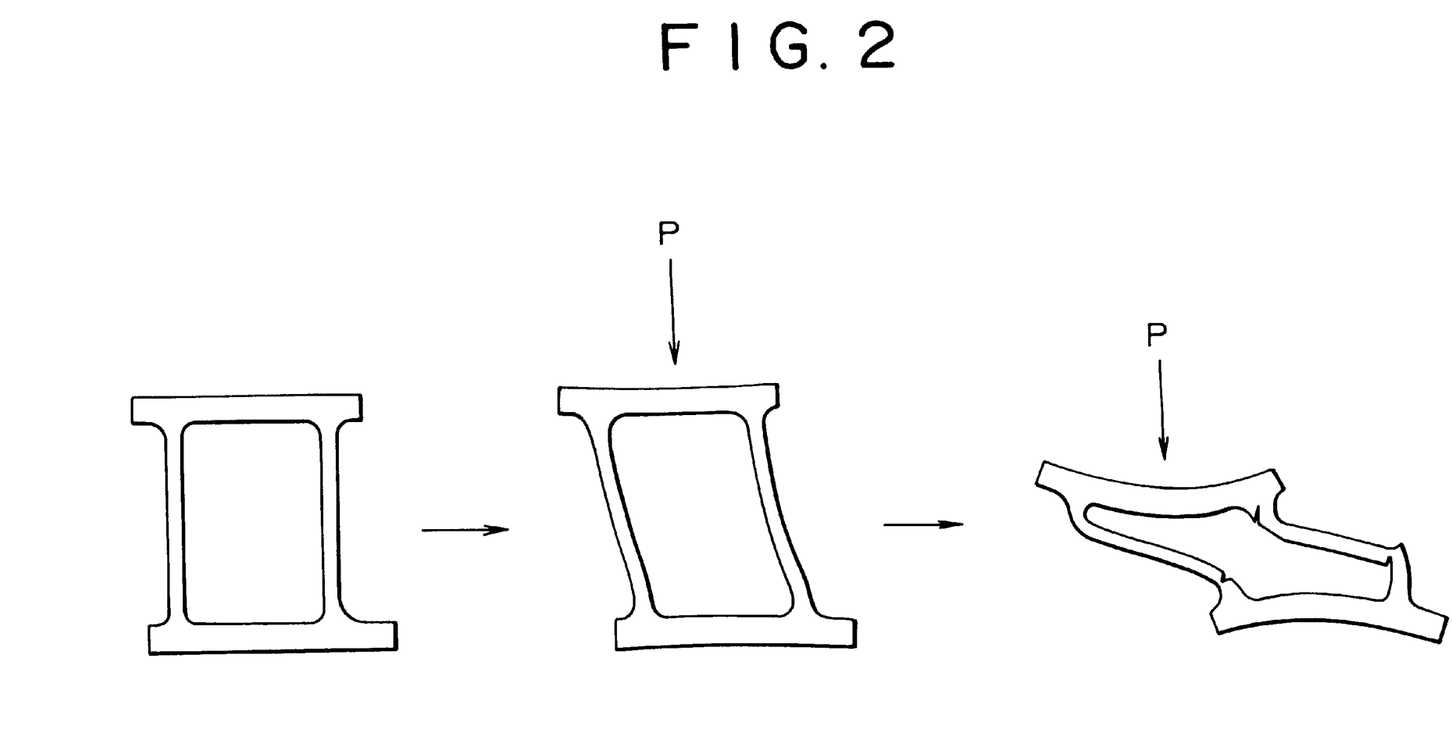
FIG. 2 is representations for illustrating progress in buckling distortion in cross-section of FIG. 1.

On the other hand, since in a door beam of an aluminum alloy according to the present invention, a central line (a) of a compression-side flange is spaced from a central line (b) of a tension-side flange, under a bending load receives, as shown in FIG. 2, a beam section is apt to be flattened, producing buckling distortion (deformation into an almost rhombic shape). As rupture progresses, a load is greatly reduced before a strain is accumulated to the level of occurring of rupture in the tension-side, so that a load on the tension-side flange 2 is alleviated. With this reduction of the strain, rupture in the tension-side is hard to occur and rupture in the compression-side is also hard to occur.

Figure 9:
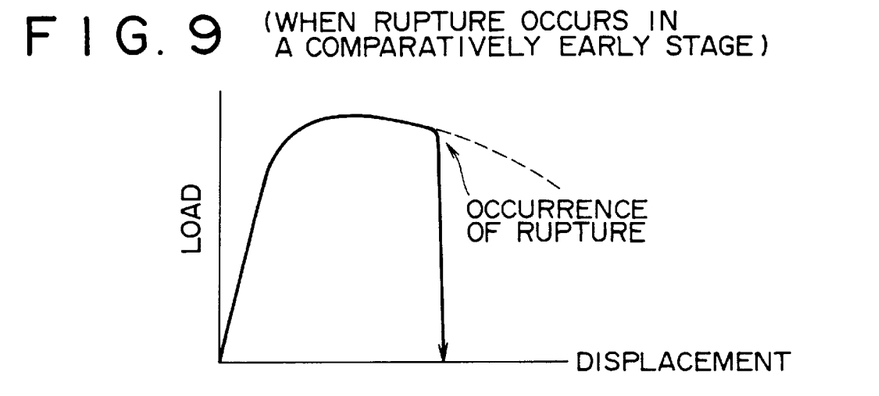
FIG. 9 shows a load-displacement curve when a rupture occurs in a comparatively early stage.

In a door beam according to the present invention, as shown in FIG. 11, a principal axis (C) is inclined from a loading direction (P), indicated by an arrow, by an angle in the range from 5 degrees to 25 degrees. When the angle is less than 5 degrees, in a stage where a deformation is comparatively small, buckling distortion does not conspicuously appear (retains its original shape with ease), while as a tensile-strain in the tension-side flange is increased, rupture occurs as in the case of a conventional door beam. When rupture occurs in a comparatively early stage, energy absorption is small (see FIG. 9).

Figure 8:
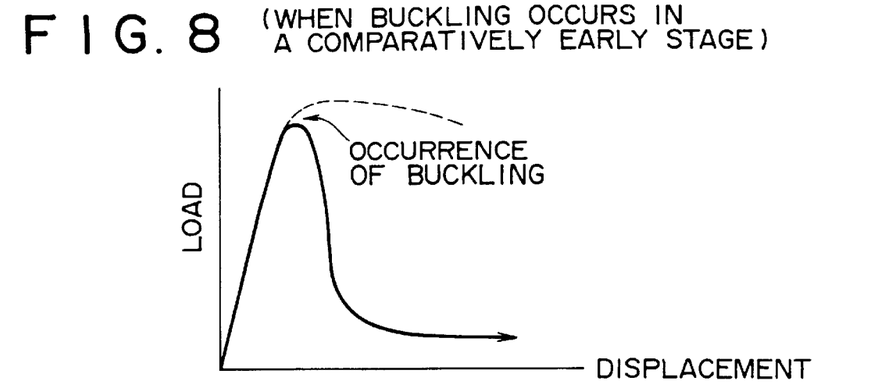
FIG. 8 shows a load-displacement curve when buckling occurs in a comparatively early stage.

When the angle is larger than 25 degrees, buckling distortion conspicuously appears in a stage where a deformation is comparatively small and a load is greatly reduced, while rupture can be avoided, sufficient energy absorption cannot be attained (see FIG. 8).

Figure 10:
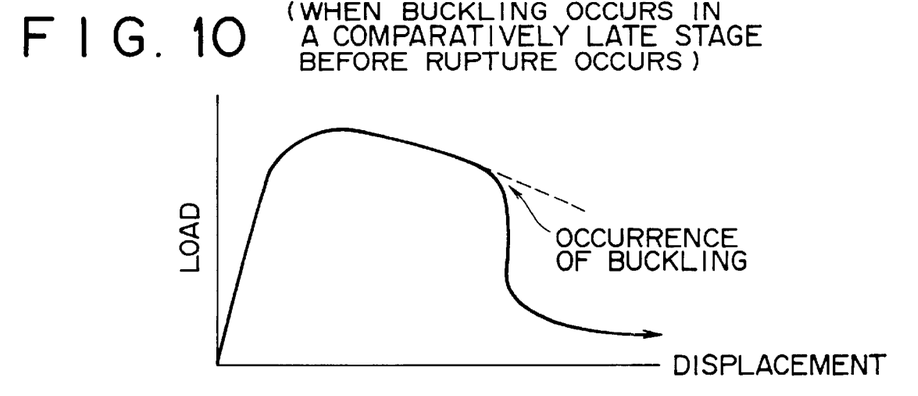
FIG. 10 shows a load-displacement curve when buckling occurs in a comparatively late stage before a rupture occurs.
Figure 12:
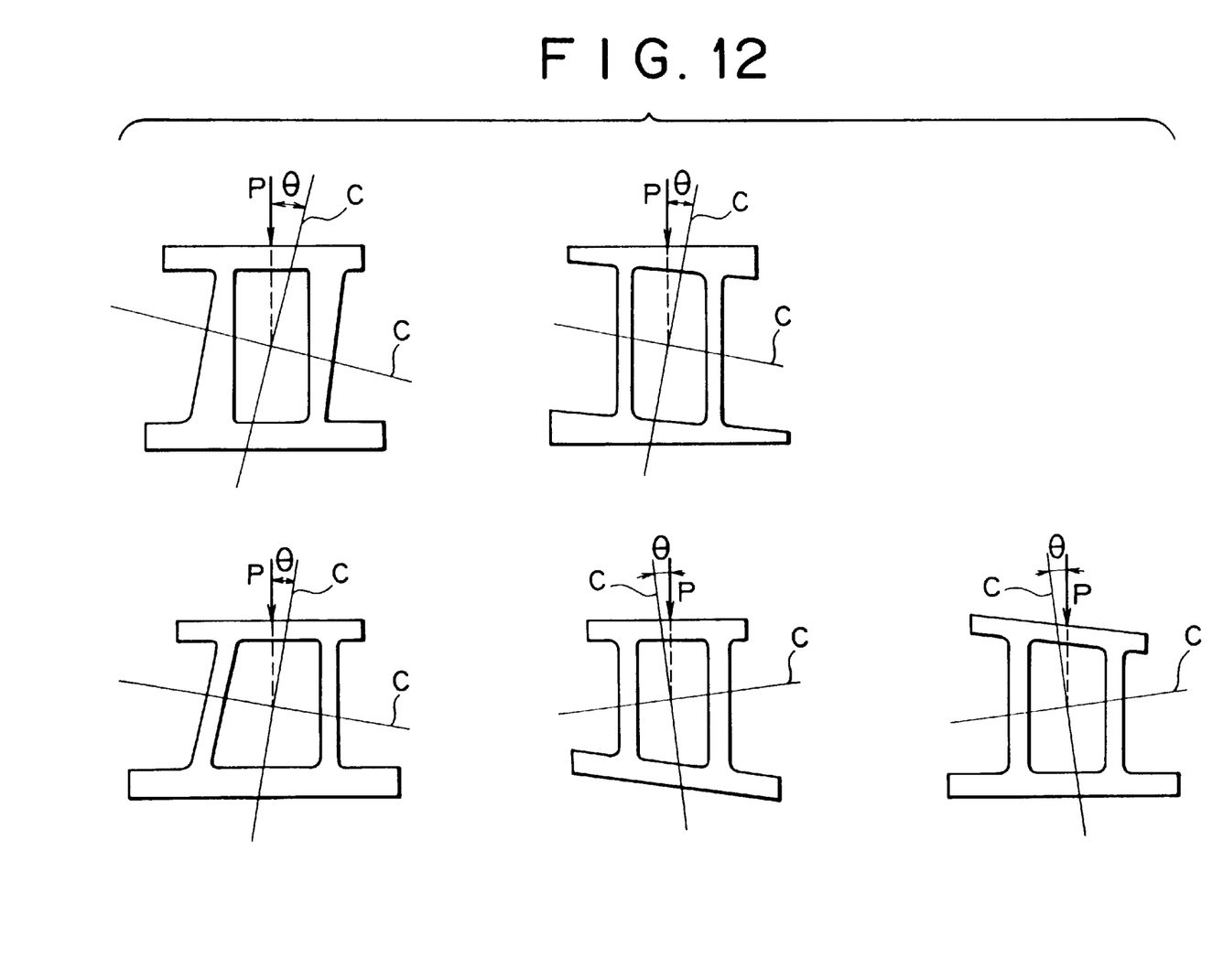
FIG. 12 shows other types of cross-sections of door beams according to the present invention.

When the angle is in the range from 5 degrees to 25 degrees as in the present invention, buckling distortion can be caused to occur in a stable manner in a stage where a deformation is comparatively large before rupture occurs, (see FIG. 10). In the present invention, when a principal axis is inclined from a loading direction by an angle in the range from 5 degrees to 25 degrees, such as when a thickness each of the tension-side flange and the compression-side flange (or either of both) is not uniform and when neither the tension-side flange nor the compression-side is (or one of both is not) perpendicular to the webs geometrically and the like case, as shown in FIG. 12, the above described buckling distortion can be produced in a stable manner. Cross sectional parameters are intentionally devised so that in any case where a load is imposed, deformation about a principal axis about which a moment of inertia is minimal is easy to be produced but that the buckling distortion is produced in a stage where the deformation is as large as possible.

A door beam according to the present invention is not limited to a door beam with a pair (two) of webs, but may be a door beam with one or three (or more than three) webs.

Besides, a door beam according to the present invention is not limited to the case where lengths of extensions in both sides of the tension-side flange are different from each other and lengths of extensions in the both sides of the compression-side flange are also different from each other, but may include the case where lengths of extensions in both sides of one of the tension-side flange and the compression-side flange are different from each other, while lengths of extensions in the both sides of the other are same as each other.

In the mean time, in this door beam, it is preferable that a section area of the tension-side flange is formed larger than that of the compression-side flange and thereby a neutral axis of bending is displaced toward the tension-side flange.

When a sectional area of the tension-side flange is formed larger than that of the compression-side flange (a length or a thickness of the tension-side flange is larger than that of the compression-side), a neutral axis of bending is displaced toward the tension-side flange, and in the same displacement, a tensile-strain in the tension-side flange is less and rupture is hard to occur.

In addition, the inventors uncovered that in the present invention, there are correlations between forms/conditions of deformation, and Charpy impact values or strain hardening exponents (n value) when a door beam is bent.

That is, according to the present invention, preferably a door beam of an Al—Zn—Mg series aluminum alloy has a Charpy impact value in the range from 23 to 34 $J/cm^2$ and an n value in the range from 0.05 to 0.17 and preferably a door beam of an Al—Si—Mg series aluminum alloy has a Charpy impact value in the range from 31 to 49 $J/cm^2$ and an n value in the range from 0.07 to 0.20.

While any of various kinds of aluminum alloys such as Japanese Industrial Standard 7N01, 6061, 6N01 and the like can be applied for a door beam of the present invention, compositions of Al—Zn—Mg series aluminum alloys and Al—Si—Mg series aluminum alloys which are most preferably adopted will be described below. (Al—Zn—Mg series aluminum alloys)

A preferable Al—Zn—Mg series aluminum alloy includes Zn and Mg in the ranges of Zn: 4 to 7 mass %, Mg: 0.8 to 1.5 mass %. In addition, other components can be included and a preferable Al—Zn—Mg series aluminum alloy comprises at least one kind in a content selected from the group consisting of the following elements in the content ranges of Zn: 4 to 7 mass %, Mg: 0.8 to 1.5 mass %, Ti: 0.005 to 0.3 mass %, Cu: 0.05 to 0.6 mass %, Mn: 0.2 to 0.7 mass %, Cr: 0.05 to 0.3 mass % and Zr: 0.05 to 0.25 mass %, and the rest including aluminum and impurities. The reasons why the respective components in specified contents are added are as follows:

Zn, Mg

Zn and Mg are necessary elements for maintaining a strength of an aluminum alloy. When Zn is included at less than 4 mass % or Mg is included at less than 0.8 mass %, a desired strength cannot be attained. When Zn is included at more than 7 mass % or Mg is included at more than 1.5 mass %, not only extrudability of an aluminum alloy is reduced, but elongation also decreases and desired characteristics cannot be obtained. Hence, the contents of Zn: 4 to 7 mass % and Mg: 0.8 to 1.5 mass % are selected.

Ti

Ti is an element necessary for making a structure of ingot finer. When Ti is included at less than 0.05 mass %, an effect of the making finer is not sufficient, while when Ti is at more than 0.3 mass %, Ti is saturated to form a giant compound. Hence, a content of Ti: 0.05 to 0.3 mass % is selected.

Cu, Mn, Cr and Zr

The elements raises a strength of an aluminum alloy. Besides, Cu is effective for improving on a resistance to a stress corrosion cracking of an aluminum alloy and Mn, Cr and Zr forms a fiber structure in an extrusion and thereby strengthen the alloy, wherein one or, two or more kinds selected from the elements are added in a proper manner. Preferable ranges of the metals are: Cu: 0.05 to 0.6 mass %, Mn: 0.2 to 0.7 mass %, Cr: 0.05 to 0.3 mass % and Zr: 0.05 to 0.25 mass %. When the elements are individually included in respective contents less than the lower limits thereof, the actions described above are insufficiently exercised and when the elements are individually included respective contents more than the upper limit, extrudability of the alloy is deteriorated, wherein especially in the case of Cu, a general corrosion resistance is additionally degraded.

Impurities

Fe of impurities is an impurity most included in aluminum ground metal and when Fe is included in the alloy at more than 0.35 mass %, an intermetallic compound in the coarse form is formed being crystallized in casting, deteriorating mechanical properties. Hence, Fe is restricted at 0.35 mass % or less.

When an aluminum alloy is cast, impurities are incorporated through various routes such as a ground metal, an intermediate alloy of an additive metal and the like. Various elements are mixed into the aluminum alloy, but impurities other than Fe affects almost no influence on the characteristics of an aluminum alloy as far as respective contents of the impurities are singly 0.05 mass % or less and collectively 0.15 mass % or less. Therefore, The impurities are limited at 0.05 or less singly or 0.15 mass % or less collectively.

(Al—Si—Mg Series Aluminum Alloys)

A preferable Al—Si—Mg series aluminum alloy includes Si and Mg in the ranges of Si: 0.5 to 1.5 mass %, Mg: 0.5 to 1.3 mass %. In addition, other components can be included and a preferable Al—Si—Mg series aluminum alloy comprises at least one kind in a content selected from the group consisting of the following elements in the content ranges of Si: 0.5 to 1.5 mass %, Mg: 0.5 to 1.3 mass %, Ti: 0.005 to 0.2 mass %, Cu: 0.1 to 0.7 mass %, Mn: 0.05 to 0.6 mass %, Cr: 0.05 to 0.2 mass % and Zr: 0.05 to 0.2 mass %, and the rest including aluminum and impurities. The reasons why the respective components in specified contents are added are as follows:

Si, Mg

Si and Mg are necessary elements for maintaining a strength of an aluminum alloy. When Si is included at less than 0.5 mass % or Mg is included at less than 0.5 mass %, a desired strength cannot be attained. When Si is included at more than 1.5 mass % or Mg is included at more than 1.3 mass %, not only extrudability of an aluminum alloy is reduced, but elongation also decreases and desired characteristics cannot be obtained. Hence, the contents of Si: 0.5 to 1.5 mass % and Mg: 0.5 to 1.3 mass % are selected.

On the other hand, Ti, Cu, Mn, Cr, Zr and other impurities are restricted within the above described limits for the similar reasons in the Al—Zn—Mg series aluminum alloy.

A door beam series of the present invention is made of an extrusion of a aluminum alloy and a recrystallization thereof is preferably a fiber structure in order to attain a larger maximal load and a larger energy absorption, wherein a fiber structure is a structure, which is formed by extrusion, and which is observed in an extrusion and a micro-structure which is elongated along an extrusion direction.

DETAILED DESCRIPTION OF THE INVENTION

EXAMPLE

Figure 5:
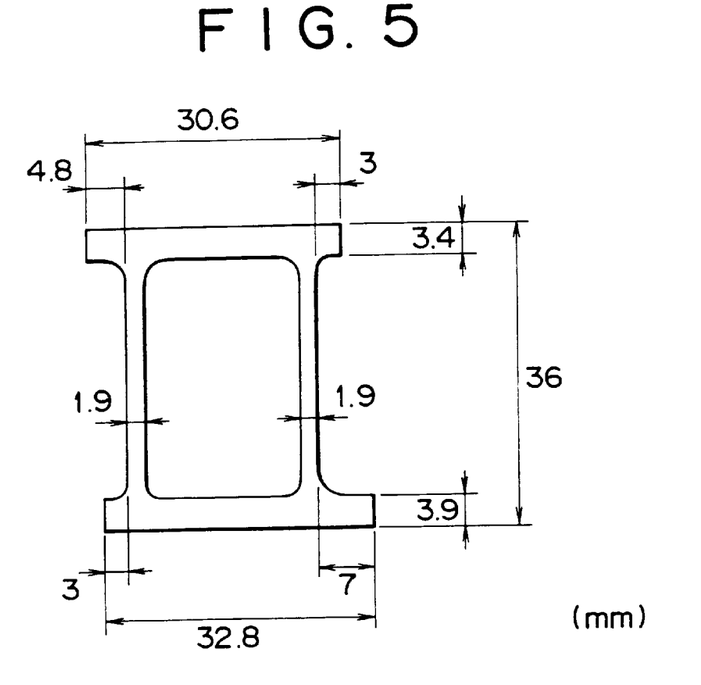
FIG. 5 shows a cross-section of a door beam used in an example (the present invention).

Extrusions of an Al—Mg—Zn series aluminum alloy including Mg: 1.4 mass %, Zn: 6.5 mass %, Cu: 0.2 mass % and Zr: 0.15 mass % with the cross-section showing in FIG.

Figure 6:
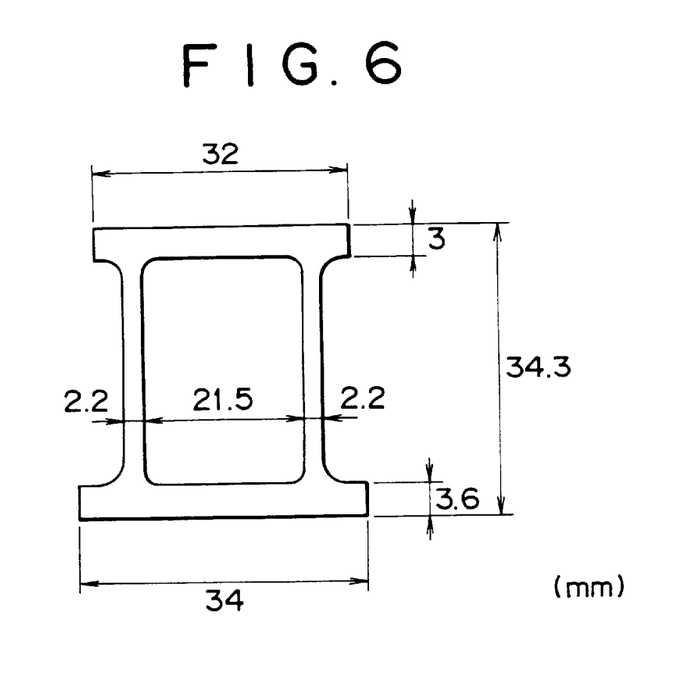
FIG. 6 shows a cross-section of a door beam used in an example (a comparative example).

5 (the present invention) and FIG. 6 (a comparative example) were set for the three-point bending test with a span of 750 mm and a semicircular cylinder rigid body was pressed down by up to a displacement of 300 mm. A load (P)-displacement (δ) curve which was obtained in the test is shown in FIG. 7 and comparison among numerical values is shown in Table 1.

TABLE 1

|  | unit weight | maximal load | rupture displacement | buckling displacement |
|---|---|---|---|---|
| Comparative example | 0.98 kg/m | 1296 kgf | 129 mm | no occurrence |
| Invention example | 0.95 (kg/m) | 1306 (kgf) | no occurrence | 132 mm | rupture displacement: a displacement of a semicircular cylinder rigid body when a tension-side flange is ruptured and a load is suddenly decreased.
buckling displacement: a displacement of a semicircular cylinder rigid body when a buckling distortion (deformation into an almost rhombic shape) conspicuously occurs and a load is suddenly decreased.

Figure 7:
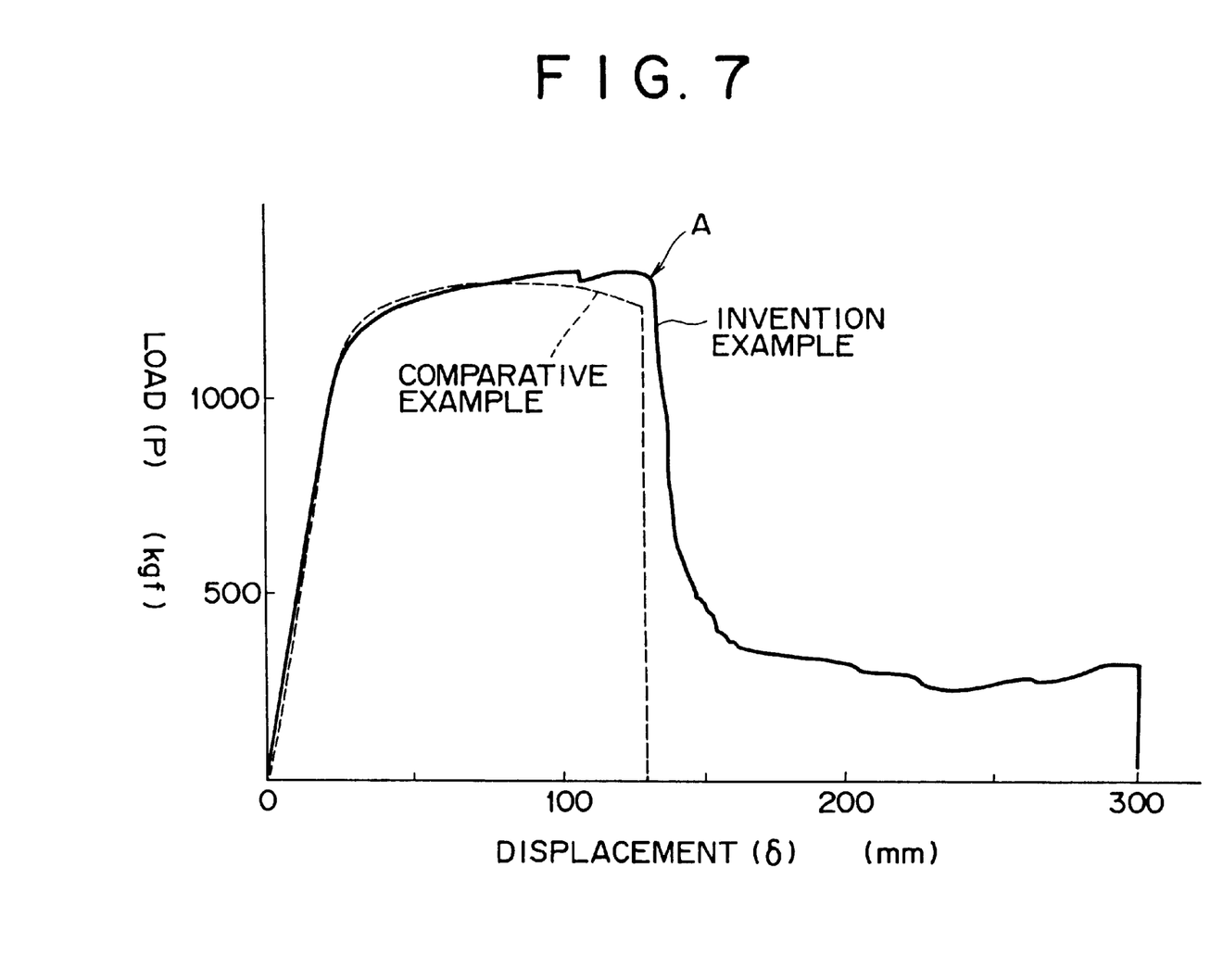
FIG. 7 is a load-displacement curve obtained in the examples.

As shown in FIG. 7 and Table 1, a door beam of the comparative example had a rupture displacement of 129 mm, whereas the door beam of the present invention started buckling distortion at point (A) but rupture did not occur. A maximal load and an energy absorption (an area enveloped by a P-δ ( curve) of the door beam according to the present invention were larger than the comparative example.

Besides, an extrusion of an Al—Mg—Zn series aluminum alloy including Mg: 1.4 mass %, Zn: 6.5 mass %, Cu: 0.2 mass % and Zr: 0.15 mass % with a basic cross-section as shown in FIG. 11, wherein cross sectional parameters $c_1$, $c_2$, $d_1$, $d_2$ and $\theta$ were changed as in Table 2 was set for the three-point bending test with a span of 750 mm and a semicircular cylinder rigid body was pressed down by up to a displacement of 300 mm. In the mean time, cross-sections shown in Table 2 are all same in door beam height and web thickness, and in addition, same in area of the tension-side flange and the compression-side flange. Accordingly, when it is assumed that there is no change in sectional area, maximal loads of all the test pieces are theoretically same. Displacements at which rupture or buckling respectively occurred are also shown in Table 2.

in a stage which is a little early, an angle between a principal axis and a loading direction is preferably set at 25 degrees or less.

According to the present invention, no rupture occurs and deformation of a cross-section can be effected in a stable manner even when a beam length is short. Besides, a maximal load and an energy absorption which are required can be attained without increase in weight.

What is claimed is:

1. A door beam of an aluminum alloy having a cross-section that a compression-side flange and a tension-side flange are connected parallel to each other, by at least two webs in a section perpendicular to a length direction and central lines of the compression-side flange and a tension-side flange are shifted from each other.

2. A door beam of an aluminum alloy according to claim 1, wherein a pair of webs are provided and the pair of webs are perpendicular to the compression-side flange and the tension-side flange.

3. A door beam of an aluminum alloy according to claim 1, whose length in the length direction is 800 mm or less.

4. A door beam of an aluminum alloy according to any claim 1, wherein the aluminum alloy is an Al—Zn—Mg series aluminum alloy having a Charpy impact value in the range from 23 to 34 J/cm$^2$ and an n value in the range from 0.05 to 0.17.

5. A door beam of an aluminum alloy according to claim 1, wherein the aluminum alloy is an Al—Si—Mg series aluminum alloy having a Charpy impact value in the range from 31 to 49 J/cm$^2$ and an n value in the range from 0.07 to 0.20.

6. A door beam of an aluminum alloy according to any of claim 1, wherein the aluminum alloy is an Al—Zn—Mg series aluminum alloy including Zn and Mg in the ranges of Zn: 4 to 7 mass % and Mg: 0.8 to 1.5 mass %.

7. A door beam of an aluminum alloy according to claim 1, wherein the aluminum alloy is an Al—Si—Mg series aluminum alloy including Si and Mg in the ranges of Si: 0.5 to 1.5 mass % and Mg: 0.5 to 1.3 mass %.

8. A door beam of an aluminum alloy having a cross-section that a compression-side flange having extensions in both sides and a tension-side flange having extensions in both sides are connected parallel to each other, by at least

TABLE 2

| No. | $c_1$ (mm) | $c_2$ (mm) | $d_1$ (mm) | $d_2$ (mm) | angle $\theta$ (°) | maximal load (kgf) | buckling displacement (mm) | rupture displacement | note |
|---|---|---|---|---|---|---|---|---|---|
| 1 | 3.9 | 3.9 | 5.0 | 5.0 | 0.0 | 1306 | none | 173 | Comparative example |
| 2 | 5.4 | 2.4 | 3.2 | 6.8 | 9.3 | 1280 | 87 | none | Invention example |
| 3 | 5.8 | 2.0 | 2.6 | 7.4 | 12.3 | 1288 | 90 | none | Invention example |
| 4 | 4.8 | 3.0 | 3.0 | 7.0 | 8.5 | 1306 | 132 | none | Invention example |
| 5 | 7.8 | 0.0 | 5.0 | 5.0 | 13.0 | 1268 | 77 | none | Invention example |
| 6 | 7.8 | 0.0 | 0.0 | 10.0 | 26.5 | 1192 | 46 | none | Invention example | angle: an angle between a principal axis and a loading direction
rupture displacement: a displacement of a semicircular cylinder rigid body when a tension-side flange is ruptured and a load is suddenly decreased.
buckling displacement: a displacement of a semicircular cylinder rigid body when a buckling distortion (deformation into an almost rhombic shape) conspicuously occurs and a load is suddenly decreased.
none: no buckling occurs or no rupture occurs As shown in Table 2, rupture occurred in a door beam (No. 1), while in door beams (No. 2, 3, 4, 5), no ruptures occurred and buckling were produced in comparatively late stages and energy absorptions were larger. While in a door beam (No. 6), no rupture occurred, since buckling got started one web in a section perpendicular to a length direction and that the extensions in both sides of the compression-side flange are different in length and the extensions in both sides of the tension-side flange are also different in length, while longer side ends of the extensions of the compression-side flange and the extensions of the tension-side flange are in one diagonal.

9. A door beam of an aluminum alloy according to claim 8, wherein a pair of webs are provided and the pair of webs are perpendicular to the compression-side flange and the tension-side flange.

10. A door beam of an aluminum alloy according to claim 8, whose length in the length direction is 800 mm or less.

11. A door beam of an aluminum alloy according to claim 8, wherein the aluminum alloy is an Al—Zn—Mg series aluminum alloy having a Charpy impact value in the range from 23 to 34 J/cm$^2$ and an n value in the range from 0.05 to 0.17.

12. A door beam of an aluminum alloy according to claim 8, wherein the aluminum alloy is an Al—Si—Mg series aluminum alloy having a Charpy impact value in the range from 31 to 49 J/cm$^2$ and an n value in the range from 0.07 to 0.20.

13. A door beam of an aluminum alloy according to claim 8, wherein the aluminum alloy is an Al—Zn—Mg series aluminum alloy including Zn and Mg in the ranges of Zn: 4 to 7 mass % and Mg: 0.8 to 1.5 mass %.

14. A door beam of an aluminum alloy according to claim 8, wherein the aluminum alloy is an Al—Si—Mg series aluminum alloy including Si and Mg in the ranges of Si: 0.5 to 1.5 mass % and Mg: 0.5 to 1.3 mass %.

15. A door beam of an aluminum alloy having a cross-section that a compression-side flange and a tension-side flange are connected by at least one web in which a principal axis is inclined from a loading direction by an angle in the range from 5 degrees to 25 degrees in a section perpendicular to a length direction.

16. A door beam of an aluminum alloy according to claim 15, wherein a pair of webs are provided and the pair of webs are perpendicular to the compression-side flange and the tension-side flange.

17. A door beam of an aluminum alloy according to claim 15, whose length in the length direction is 800 mm or less.

18. A door beam of an aluminum alloy according to claim 15, wherein the aluminum alloy is an Al—Zn—Mg series aluminum alloy having a Charpy impact value in the range from 23 to 34 J/cm$^2$ and an n value in the range from 0.05 to 0.17.

19. A door beam of an aluminum alloy according to claim 15, wherein the aluminum alloy is an Al—Si—Mg series aluminum alloy having a Charpy impact value in the range from 31 to 49 J/cm$^2$ and an n value in the range from 0.07 to 0.20.

20. A door beam of an aluminum alloy according to claim 15, wherein the aluminum alloy is an Al—Zn—Mg series aluminum alloy including Zn and Mg in the ranges of Zn: 4 to 7 mass % and Mg: 0.8 to 1.5 mass %.

21. A door beam of an aluminum alloy according to claim 15, wherein the aluminum alloy is an Al—Si—Mg series aluminum alloy including Si and Mg in the ranges of Si: 0.5 to 1.5 mass % and Mg: 0.5 to 1.3 mass %.

* * * * *